United States Patent [19]

Bertram

[11] Patent Number: 4,720,010

[45] Date of Patent: Jan. 19, 1988

[54] STOCK ASSEMBLY FOR STORING AND SUCCESSIVELY SUPPLYING CLOSED LOOP MEMBERS FOR SUSPENDING SAUSAGES

[76] Inventor: Hans J. Bertram, 26, Strassheimer Weg, Rossbach, v.d.H., 6365 DEX

[21] Appl. No.: 445,010

[22] Filed: Nov. 29, 1982

[30] Foreign Application Priority Data

Nov. 30, 1981 [DE] Fed. Rep. of Germany ....... 3147386

[51] Int. Cl.⁴ .............................................. B65D 85/00
[52] U.S. Cl. .................... 206/345; 206/340; 206/348; 206/478; 206/820; 17/35; 17/44.2
[58] Field of Search ...................... 206/63.5, 390, 340, 206/343, 345, 348, 478, 479, 813, 820; 294/159, 160, 162, 163; 17/35, 44, 44.2, 44.3

[56] References Cited

U.S. PATENT DOCUMENTS

| | | | |
|---|---|---|---|
| 2,836,290 | 5/1958 | Braun | 206/820 |
| 3,038,596 | 6/1962 | Anstett | 206/345 |
| 3,162,871 | 12/1964 | Powers | 206/343 |
| 3,174,888 | 3/1965 | Morgan | 206/813 |
| 3,276,576 | 10/1966 | Langas et al. | 206/345 |
| 3,501,365 | 3/1970 | Marshall | 206/390 |
| 3,692,176 | 9/1972 | Templeton et al. | 206/820 |
| 3,951,262 | 4/1976 | Niedecker | 206/343 |
| 4,060,168 | 11/1977 | Romagnoli | 206/820 |
| 4,132,309 | 1/1979 | Shaylor | 206/813 |
| 4,411,361 | 10/1983 | Mentzer | 206/477 |

Primary Examiner—Stephen Marcus
Assistant Examiner—David T. Fidei
Attorney, Agent, or Firm—Larson and Taylor

[57] ABSTRACT

A stock assembly is provided for storing a mass of individual closed loops used in suspending sausages and for successively supplying the loops to an automatic sausage-sealing machine. Each loop comprises a piece of yarn arranged in an elongated loop configuration with the ends thereof knotted together at one end of the loop. The stock assembly includes a long strip member of resilient material adapted to be wound onto a reel. The loops are detachably affixed to the strip member lengthwise thereof one after the other in closely spaced relationship so that each loop member overlaps the adjacent loop member at one end thereof and is overlapped by the adjacent loop member of the other end thereof.

6 Claims, 3 Drawing Figures

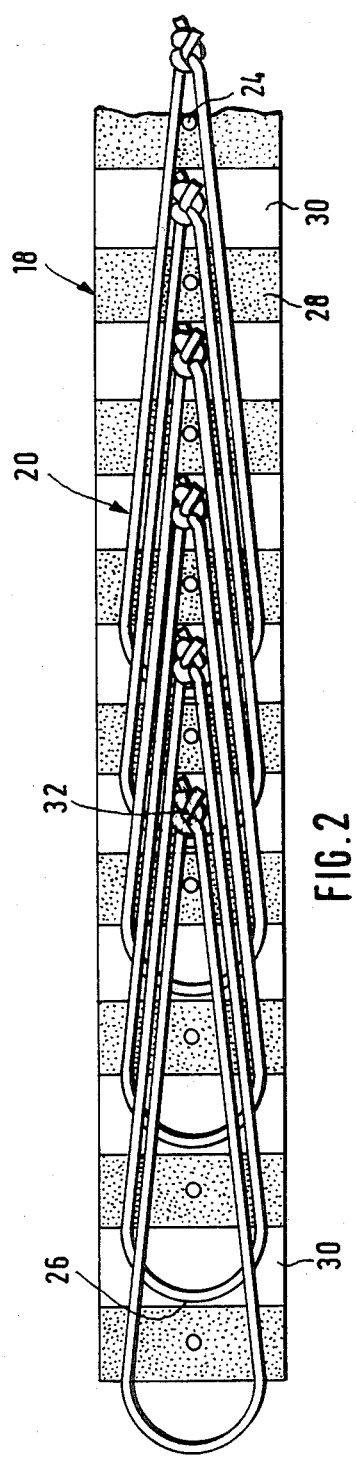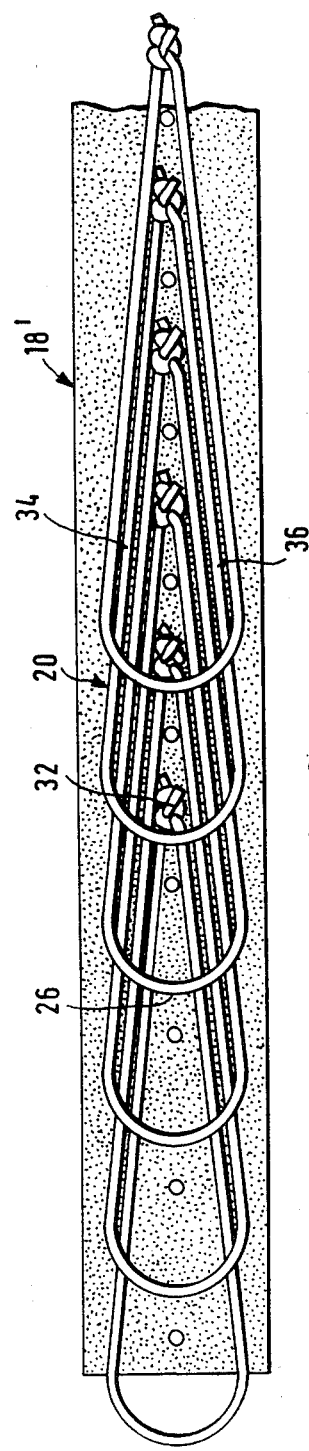
FIG.2
FIG.3

STOCK ASSEMBLY FOR STORING AND SUCCESSIVELY SUPPLYING CLOSED LOOP MEMBERS FOR SUSPENDING SAUSAGES

BACKGROUND OF THE INVENTION

1. Field of the Invention

The present invention is concerned with a stock assembly adapted to store and supply loop members for suspending sausages, composed of a strip adapted to be wound to form a reel on which are seated the loop members knotted from yarn that in open condition are oriented with the knot on the loop end, with the free ends of the loop members opposite the knotted ends being detachable on said strip.

2. Description of the Prior Art

In a stock assembley of this type as known by U.S. Pat. No. 3,951,262 of Niedecker, the loop members for suspending sausages spaced in side-by-side relationship on a belt forming the strip are fixed to their approximately parallel sides equally disposed in spaced relationship, in a manner that open partial loop members protrude from both sides of the belt, with the loop members being preferably secured to the belt by means of two strips of paper, plastic material or textile fabric, with the strips being adhesively joined to each other, i.e. the two strips between which the loop members are secured, form the belt. When singling the loop members at the processing station during laying the clips on the sausages, parts cut or torn off the belt will, therefore, be left on the loop members thereby affecting not only the outward appearance but also hampering the suspension of the sausages. Moreover, it is imperative that the belt be carefully reeled up in precisely superposed layers resulting in a rapid growth of the reel diameter with the consequence that the belt length adapted to be reeled up is limited and the stock on the reel during processing is used up correspondingly rapidly.

SUMMARY OF THE INVENTION

It is an object of the invention to remove this disadvangage envolved with the prior art system and to provide a stock assembly for storing and supplying loop members for suspending sausages that is able to hold substantially larger amounts of loop members and in which the loop members can readily and fully be separated from the strip.

In accordance with the invention, this object is achieved in that the suspending loop members are detachably secured to the strip in the longitudinal direction thereof in a manner overlapping one another in scale-type way.

The stock assembly of the invention hence avoids parts protruding beyond the lateral edges of the strip none the less permitting, due to the scale-type overlapping of the loop members, the open ends of the loop opposite the knotted ends to be fed to the machine for sealing the sausage ends, with the loop members included.

The strip preferably is an adhesive tape onesidedly coated by a self-adhesive layer.

There are two alternatives for safeguarding that the afore-mentioned free ends be fed to the sealing machine; In a first form of embodiment of the invention, the strip comprises alternating adhesive and non-adhesive sections with the suspending loop members overlapping one another with the free ends being bottommost and being provided on the non-adhesive section of the strip. This causes the free ends of the loops during withdrawal of the belt to protrude beyond a sharp edge or thin rod on account of their inherent stiffness to such an extent that they can be readily seized by the sealing machine without being hampered by the belt.

According to another form of embodiment of the invention for safeguarding a trouble-free exposure of the free ends of the loop members, the strip is continuously adhesive and the suspending loop members with the free ends thereof lie on the sides of the respectively preceding loop members, with the sides thereof external of the sides of the respectively preceding loop members extending toward the knotted ends. It has proved that, here, too, the knotted ends can be readily seized by the sealing tools as during withdrawal of the respectively preceding loop members they are separated from the adhesive layer through the knotted ends of the loop members withdrawn from thereunder.

The overlap density can be randomly selected. However, it has proved feasible that respectively a plurality of loops, for example five loops, overlap one another, thereby utilizing the adhesive tape to a higher extent and none the less safeguarding the desired single separation of the loop members during processing.

According to another advantageous form of embodiment of the invention, the strip with the loop members on it is cross-wound permitting accommodation of wealthy strip lengths and correspondingly large numbers of loop members for suspending sausages on a single stock assembly. Hence, the proportion of down times envolved with mounting another stock assembly is, therefore, correspondingly low.

To safeguard the trouble-free supply of the loop members in synchronism with the sealing process, the strip here, too, in known manner can be formed with holes or peripheral recesses provided at regular longitudinal intervals for engagement by a driving element.

BRIEF DESCRIPTION OF THE DRAWING

The invention will now be illustrated in detail by way of the drawing, wherein

FIG. 2 is a top plan view of a strip section showing a first form of embodiment of the invention, and FIG. 3 is a corresponding top plan view showing a second form of embodiment of the invention.

DESCRIPTION OF THE PREFERRED EMBODIMENTS

Figure 1:
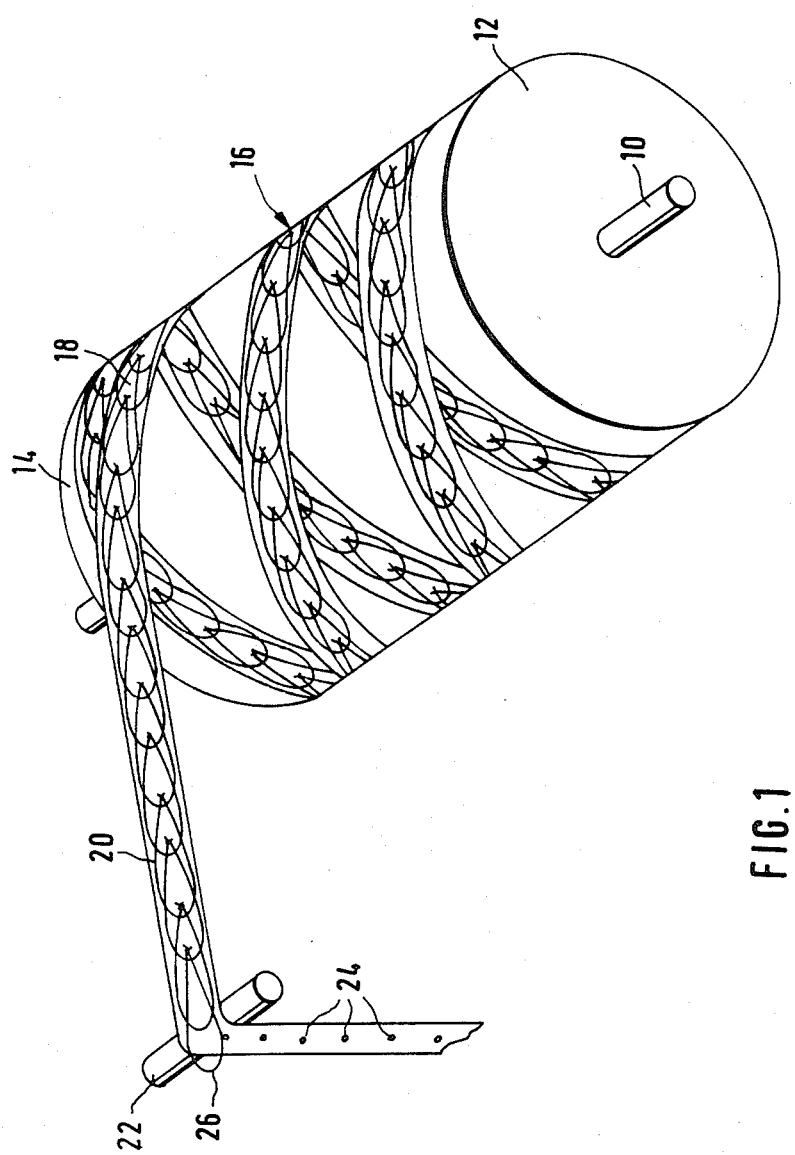
FIG. 1 is a perspective view showing a stock assembly according to the invention with a strip withdrawn approximately at right angles via a rod.

According to FIG. 1, a reel body formed by a shaft 10 and end plates 12, 14 carries a cross-coil 16 formed of a strip 18 to which are applied by way of adhesive yarn-knotted loop members 20 for suspending sausages, overlapping one another in scale-type manner. During processing, the strip is withdrawn from reel 10,12,14 via a thin shaft or rod 22 by way of a driving element (not shown) engaging holes 24 centrally of the strip provided at regular intervals thereby causing free ends 26 of the loop members 20 for suspending sausages disposed forwardly in the direction of withdrawal to protrude from the break-off point, in a manner described in the following and to be fed to a sealing machine (not shown) for being laid into the sealing clips on the ends of the sausage.

According to the inventive embodiment of FIG. 2, strip 18 is an adhesive tape having alternating adhesive sections 28 and interposed non-adhesive sections 30 the pitch of which corresponds to the suspending loop members 20. The pitch can be the same as the one of holes 24. The loop members 20 for suspending sausages are cemented to the adhesive tape in overlapping manner such that knotted ends 32 lie uppermost while free ends 26 are disposed in the non-adhesive sections 30. This will safeguard that during withdrawal of the strip via rod or shaft 22 (FIG. 1), free ends 26 on account of the inherent stiffness of the loop yarn, can protrude from the break-off point to be seized there by the sealing machine.

In the form of embodiment according to FIG. 3, strip 18' is a continuously adhesive tape, and loop members 20 for suspending sausages are cemented thereto in scale-type overlapping manner such that free ends 26 will lie on sides 34,36 of the respectively preceding loop member. Although in that embodiment also free ends 26 will be seized by the adhesive layer of the strip, this cemented connection will be broken during processing by the extraction of the respectively preceding loop so that here, as shown in FIG. 1, these ends 26 are able to freely protrude into the reach of the sealing machine.

What is claimed is:

1. A stock assembly adapted to store a mass of individual, individually closed loop members for suspending sausages and to successively supply loop members to an automatic sausage-sealing machine, each loop member comprising a pieces of yarn arranged to form an elongated loop and having the ends thereof knotted together at one end of said elongated loop, said stock assembly including an elongate strip member of resilient material adapted to wound onto a drum, said loop members being arranged in serial overlapping relationship in the direction of elongation of the loops members in a scale-like pattern and being detachably affixed to said strip member along said strip member at longitudinally spaced positions one after the other with a spacing substantially smaller than the length of each loop member such that the elongated loop of each one of the loop members overlaps the knotted end of at least one adjacent loop member at one end thereof and the knotted end of said one loop member is overlapped by the elongate loop of at least one other adjacent loop member at the other end thereof, each said loop member being affixed to said strip member at the sides of the elongated loop of that loop member and the end of each loop member opposite the knotted end thereof being arranged so as to freely protrude into a position for engagement with the sausage sealing machine when the loop members are supplied to the sausage-sealing machine, said strip and said loop members being wound to form a reel.

2. A stock assembly according to claim 1, wherein said strip member is an adhesive tape coated on one side with a self-adhesive layer.

3. A stock assembly according to claim 2, wherein said strip member comprises alternating adhesive and non-adhesive sections, with said suspending loop members overlapping one another with said free ends being disposed bottommost in the overlapping loop members and being located in the non-adhesive section of said strip member.

4. A stock assembly according to claim 2, wherein said strip is continuously adhesive and said suspending loop members with said free ends are disposed on said sides of the respectively preceding loops and the sides thereof external of said sides of the respectively preceding loop members extend toward said knotted ends.

5. A stock assembly according to claim 4, wherein a plurality of said loop members respectively overlap one another.

6. A stock assembly according to claim 4, wherein said strip member with said loop members is crosswound.

* * * * *